(12) United States Patent
Inoue

(10) Patent No.: US 9,835,218 B2
(45) Date of Patent: Dec. 5, 2017

(54) VEHICLE ACTIVE DAMPER

(71) Applicant: HONDA MOTOR CO., LTD., Tokyo (JP)

(72) Inventor: Toshio Inoue, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/151,782

(22) Filed: May 11, 2016

(65) Prior Publication Data

US 2016/0333957 A1 Nov. 17, 2016

(30) Foreign Application Priority Data

May 12, 2015 (JP) ................................ 2015-097609

(51) Int. Cl.
| | |
|---|---|
| *B60K 5/12* | (2006.01) |
| *F16F 7/10* | (2006.01) |
| *F16F 7/108* | (2006.01) |
| *B60K 5/04* | (2006.01) |
| *B60K 11/04* | (2006.01) |
| *F16F 1/36* | (2006.01) |

(52) U.S. Cl.
CPC ............. *F16F 7/1011* (2013.01); *B60K 5/04* (2013.01); *B60K 5/1208* (2013.01); *B60K 5/1216* (2013.01); *B60K 11/04* (2013.01); *F16F 1/361* (2013.01); *F16F 7/108* (2013.01); *B60Y 2200/11* (2013.01); *B60Y 2400/48* (2013.01)

(58) Field of Classification Search
CPC ........ F16F 7/1011; F16F 7/108; F16F 15/022; B60K 5/1208; B60G 11/26

USPC ................ 267/140.11–140.15, 140.2–140.4, 267/141.1–141.7; 188/267.1, 267.2
See application file for complete search history.

(56) References Cited

U.S. PATENT DOCUMENTS

| | | | | |
|---|---|---|---|---|
| 5,701,969 A | * | 12/1997 | Stephens | ............... B60K 5/1266 180/299 |
| 5,939,625 A | * | 8/1999 | Torii | ....................... B60T 8/885 267/140.11 |
| 6,349,928 B1 | * | 2/2002 | Ko | ......................... B60K 11/04 165/69 |

(Continued)

FOREIGN PATENT DOCUMENTS

| CN | 104534010 | * | 4/2015 | ................ F16F 9/53 |
|---|---|---|---|---|
| JP | 57-84223 A | | 5/1982 | |

(Continued)

OTHER PUBLICATIONS

Office Action dated Oct. 25, 2016, issued in counterpart Japanese Application No. 2015-097609. (3 pages).

*Primary Examiner* — Christopher Schwartz
(74) *Attorney, Agent, or Firm* — Westerman, Hattori, Daniels & Adrian, LLP

(57) ABSTRACT

A vehicle active damper includes a damping actuator that is provided between a radiator and a vehicle body so as to be interposed in a substantially vertical direction, and a coupling member that elastically couples between the vehicle body and an engine. The damping actuator is formed from a elastic modulus-variable member having an elastic modulus that varies according to the strength of an applied magnetic field. The coupling member transmits vibrations of the engine to the vehicle body along a substantially vertical direction.

4 Claims, 4 Drawing Sheets

(56) References Cited

U.S. PATENT DOCUMENTS

| | | | | |
|---|---|---|---|---|
| 7,261,834 B2* | 8/2007 | Fuchs | ............... | F16F 1/3605 |
| | | | | 252/62.53 |
| 7,575,082 B2* | 8/2009 | Wilbert | ............ | F16B 5/0241 |
| | | | | 165/67 |
| 8,152,145 B2* | 4/2012 | Anderson | .......... | F16F 1/361 |
| | | | | 188/267.2 |
| 8,844,914 B2* | 9/2014 | Kim | .................. | F16F 1/361 |
| | | | | 188/267.2 |
| 2005/0011710 A1* | 1/2005 | Hitchcock | ........... | F16F 1/361 |
| | | | | 188/267.2 |
| 2013/0184935 A1* | 7/2013 | Muragishi | ........... | F16F 15/02 |
| | | | | 701/37 |

FOREIGN PATENT DOCUMENTS

| | | |
|---|---|---|
| JP | 61-218429 A | 9/1986 |
| JP | 02-018361 U | 2/1990 |
| JP | 09-291966 A | 11/1997 |

* cited by examiner

VEHICLE ACTIVE DAMPER

CROSS REFERENCES TO RELATED APPLICATIONS

The present application claims priority under 35 U.S.C. §119 to Japanese Patent Application No. 2015-097609, filed May 12, 2015, entitled "Vehicle Active Damper." The contents of this application are incorporated herein by reference in their entirety.

BACKGROUND

1. Field

The present disclosure relates to a vehicle active damper that actively suppresses vibrations occurring in the body of a vehicle, soon as a car.

2. Description of the Related Art

In a vehicle installed with a reciprocating engine, such as a car, a radiator is provided for cooling a liquid medium employed as reciprocating engine coolant. The radiator, which is a weighty object, is generally attached to a front section of the vehicle so as to readily catch the flow of air accompanying vehicle travel. Japanese Unexamined Patent Application Publication No. 57-084223 describes a vibration absorbing device that absorbs vibrations occurring in a vehicle body by configuring a dynamic damper. The dynamic damper is configured by attaching a radiator to the vehicle body using an elastic body, such as rubber, and employing the radiator as an inertial mass.

The vibration absorbing device according to the Japanese Unexamined Patent Application Publication No. 57-084223 enables vibration occurring in the vehicle body to be absorbed due to the manifestation of a dynamic damper function.

However, in the vibration absorbing device according to the Japanese Unexamined Patent Application Publication No. 57-084223, the natural vibration frequency of the dynamic damper configured by interposing the elastic body, such as rubber, between the radiator and the vehicle body is set to fixed values (for example, 20 Hz to 30 Hz) by parameters of the modulus of elasticity of the elastic body and the mass of the radiator. If is therefore not possible to absorb the vibration components of frequency bands outside of the fixed values.

Moreover, if the modulus of elasticity of the elastic body, such as rubber, changes due to heat radiated from the radiator as it becomes hot, then the natural vibration frequency of the dynamic damper also changes. There is accordingly a concern that, as a result, it may not foe possible for a sufficient damping effect to be manifested for vibration components in the target frequency band.

SUMMARY

In view of the above circumstances, the present application describes a vehicle active damper capable of securing an attenuation effect for vibration components over a wide frequency band.

A first aspect of the present application is a vehicle active damper that actively suppresses vibrations occurring in the body of a vehicle. The vehicle active damper includes a first elastic member that is provided between a radiator and a vehicle body so as to be interposed along a substantially vertical direction, and a second elastic member that elastically couples between the vehicle body and an engine. The first elastic member is formed from an elastic modulus-variable member having an elastic modulus that varies according to the strength of an applied magnetic field. The second elastic member transmits vibrations of the engine to the vehicle body along a substantially vertical direction.

In the first aspect of the embodiment, the first elastic member, provided between the radiator and the vehicle body so as to be interposed along a substantially vertical direction, is formed from the elastic modulus-variable member having an elastic modulus that varies according to the strength of the applied magnetic field. The second elastic member elastically couples between the vehicle body and the engine, and transmits vibrations of the engine to the vehicle body along a substantially vertical direction.

Vibrations of the engine are respectively input to the radiator through the second elastic member, the vehicle body, and the variable elastic modulus member. In the process by which vibrations of the engine are transmitted, the apparent mass of the radiator (the inertial mass) (and hence the natural vibration frequency of the active dynamic damper) can be appropriately adjusted by control so as to apply a desired magnetic field to the first elastic member (the variable elastic modulus member) and vary the elastic modulus thereof.

In the present application, reference to the "active dynamic damper" either means the first damping control system itself, which is configured by the three elements of the radiator, the vehicle body, and the first elastic member, or means the active damper function manifested by the first damping control system (the same applies below).

The first aspect of the embodiment employs the radiator itself as an inertial mass, and actively suppress vibrations occurring in the vehicle body by using an active dynamic damper function that widens the frequency band of damping target vibration waves using the action of the first elastic member (the variable elastic modulus member). This thereby enables an attenuation effect to be secured for vibration components over a wide frequency band.

The action direction of damper waves generated by employing the first elastic member (the elastic modulus-variable member), and the transmission direction of vibrations of the engine to the vehicle body by employing the second elastic member are common directions. An effect can accordingly be anticipated of vibrations of the engine being effectively attenuated by adjusting the phase of the damper waves generated by employing the first elastic member (the elastic modulus-variable member) so as to be the opposite phase to the phase of the vibration waves of the engine.

In a second aspect of the embodiment, the second elastic member includes an extension portion that is provided to the engine and that extends from the engine towards a front side in a front-rear direction of the vehicle, and a rod portion that elongates in a substantially vertical direction so as to couple between the extension portion and the vehicle body.

The second aspect of the embodiment enables an anticipated effect of vibrations of the engine being effectively attenuated due to the vibrations of the engine being transmitted to the vehicle body in a substantially vertical direction, through the second elastic member that includes the extension portion and the rod portion. This thereby enables a situation to be suppressed from occurring in which vibrations occurring in the vehicle body are transmitted to inside the vehicle cabin.

In a third aspect of the embodiment, the rod portion is formed from an elastic modulus-variable member having an elastic modulus that varies according to the strength of an applied magnetic field. A first central frequency, positioned at substantially the center of a frequency band of damping target vibration waves in a first damping control system employing the first elastic member, and a second central frequency, positioned at substantially the center of a frequency band of damping target vibration waves in a second damping control system employing the rod portion, are set to different frequencies from each other.

Sufficient attenuation effect is not able to be manifested by the active dynamic damper of the first damping control system in the frequency bands outside the frequency band of the damping target vibration waves in the first damping control system employing the first elastic member (the elastic modulus-variable member). Moreover, there is a tendency for the magnitude of vibrations to be amplified in the frequency bands that appear at both sides on the frequency axis either side of the first central frequency compared to cases not applied with the active dynamic damper of the first damping control system.

Thus the third aspect of the embodiment includes superimposed actions of: the active dynamic damper function that widens the frequency band of the damping target vibration waves using the action of the first damping control system employing the radiator itself as the inertial mass and employing the first elastic member (the elastic modulus-variable member); and, in addition thereto, the function to widen, the frequency band of the damping target vibration waves using the action of the rod portion (the elastic modulus-variable member). When this is performed, the first central frequency and the second central frequency are set so as to be different frequencies from each other.

The third aspect of the embodiment enables an attenuation effect to be secured for vibration components in a wider frequency band than in the first aspect or the second aspect of the embodiment, due to the first central frequency and the second central frequency being set to different frequencies from each other.

In a fourth aspect of the embodiment, the first central frequency is set to a lower frequency than the second central frequency.

In the fourth aspect of the embodiment, the first central frequency, positioned at substantially the center of the frequency band of the damping target vibration waves in the first damping control system employing the first elastic member (the elastic modulus-variable member), is set to a lower frequency than the second central frequency, positioned at substantially the center of the frequency band of the damping target vibration waves in the second damping control system employing the rod portion (the elastic modulus-variable member).

In the fourth aspect of the embodiment, setting the first central frequency to a lower frequency than the second central frequency enables sufficient attenuation of vibration components of a low frequency band, due to the active dynamic damper function manifested by the first damping control system employing the radiator itself as the inertial mass, and enables sufficient attenuation of vibration components of a frequency band higher than the low frequency band, due to the damping function manifested by the second damping control system.

DESCRIPTION OF THE PREFERRED EMBODIMENTS

Figure 1A:
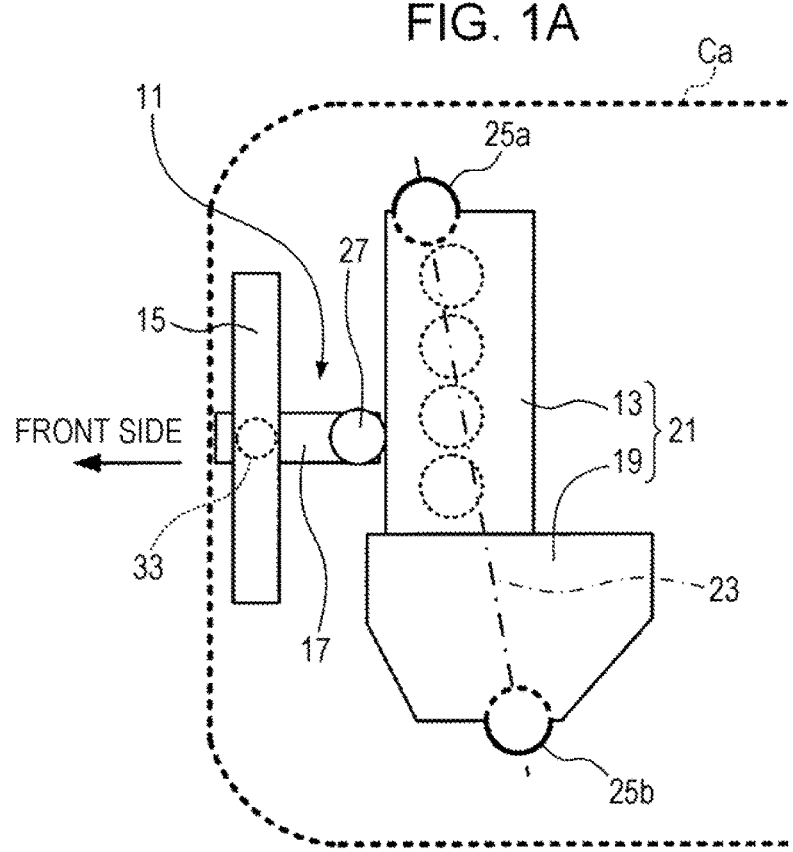
FIG. 1A is a plan view schematically illustrating a positional relationship between a vehicle active damper according to an embodiment of the present application, and a radiator and an engine provided to a vehicle.
Figure 1B:
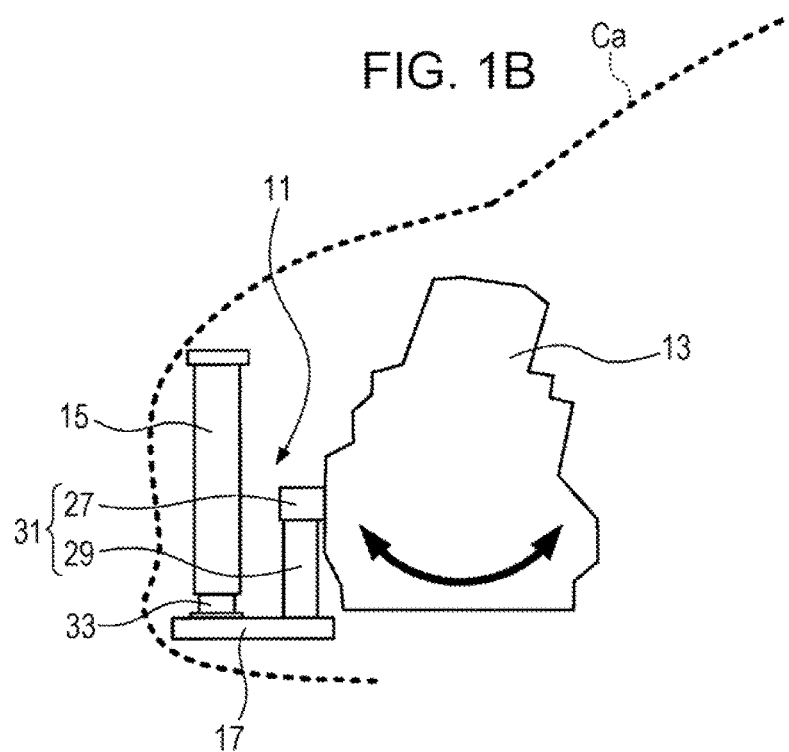
FIG. 1B is a side view schematically illustrating a positional relationship between the three elements illustrated in FIG. 1A.

Detailed explanation follows regarding a vehicle active damper 11 according to an embodiment of the present application, with reference to the drawings.
Outline Configuration of a Vehicle Applied with the Vehicle Active Damper 11 According to an Embodiment of the Present Application Explanation first follows regarding an outline configuration of a car Ca applied with the vehicle active damper 11 according to the present application, with reference to FIGS. 1A and 1B. FIG. 1A is a plan view schematically illustrating a positional relationship between the vehicle active damper 11, and an engine 13 and a radiator 15 provided to the car Ca. FIG. 1B is a side view schematically illustrating a positional relationship between the three elements illustrated in FIG. 1A.

The vehicle active damper 11 according to the present application has a function to actively suppress vibrations transmitted from the engine 13 to a vehicle body 17. The engine 13 illustrated in FIG. 1A is a transfers type of engine, in which a non-illustrated crankshaft is placed along a width direction of the vehicle. The front-side of the car Ca in FIG. 1A is on the left side of the page.

The engine 13 is, as illustrated in FIG. 1A, elastically supported, by a pair of mounts 25a, 25b disposed on a roll axis 23, this being the main overall inertial axis of a power plant 21 including the engine 13 and a transmission 19, so as to be capable of swinging like a pendulum about the roll axis 23 (see the arrow in FIG. 1B).

In order to suppress vibrations, including displacement by pendulum motion of the engine 13, the front side of the engine 13 is, as illustrated in FIGS. 1A and 1B, elastically supported by the vehicle body 17 using a coupling member 31 that includes an engine bracket 27 and a rod portion 29. The engine bracket 27 is provided to the engine 13 (either integrally provided or as a separate body) so as to extend toward, the front side of the engine 13. The engine bracket engine bracket 27 corresponds to an "extension portion" of the present application. The rod portion 29 is a member that elongates in a substantially vertical direction, so as to elastically couple between the engine bracket 27 and the vehicle body 17.

The coupling member 31 has the role of transmitting vibrations of the engine 13 in a substantially vertical direction to the vehicle body 17. The coupling member 31 has the role of preventing interference of the engine 13 and the vehicle body 17, such as with auxiliary equipment (not illustrated in the drawings), and of improving the durability performance of the engine 13, by suppressing vibration including displacement by pendulum motion of the engine 13. The coupling member 31 has the role of maintaining a pleasant environment within the vehicle cabin, by attenuating transmission to the vehicle body 17 of vibrations induced by torque fluctuations caused by fluctuations in combustion in the engine 13. The coupling member 31 including the rod portion 29 corresponds to a "second elastic member" of the present application.

In order to suppress vibrations occurring in the vehicle body 17, a damping actuator 33 configuring part of an active dynamic damper is provided so as to be interposed in a substantially vertical direction between the radiator 15 and the vehicle body 17. The damping actuator 33 corresponds to the "first elastic member" of the present application.

The active dynamic damper is configured by elastically coupling between an inertial mass (the radiator 15) and a damping target (the vehicle body 17) using the damping actuator 33. The active dynamic damper has a function to actively suppress vibrations of the vehicle body 17. Due to the radiator 15 itself vibrating, in place of vibrations of the vehicle body 17, the active dynamic damper behaves so as to actively suppress vibrations of the vehicle body 17.

Outline Configuration of the Damping Actuator 33

Figure 2A:
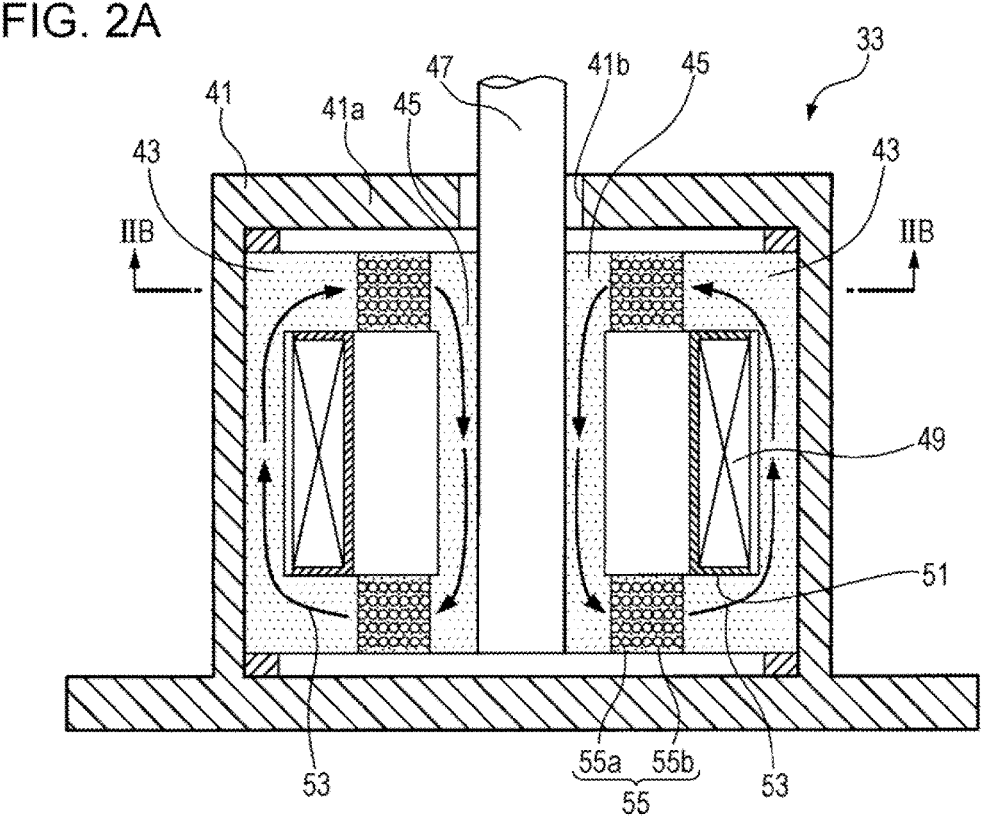
FIG. 2A is a vertical cross-section of a damping actuator that is a main element of a vehicle active damper.
Figure 2B:
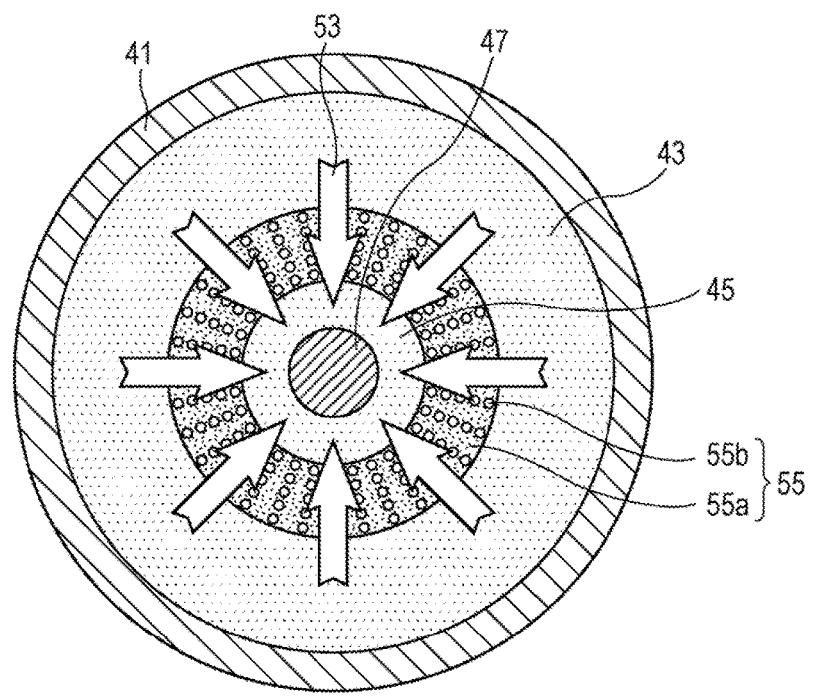
FIG. 2B is a cross-section of the damping actuator taken along line IIB-IIB of FIG. 2A, as viewed in the direction of the arrows.

Next, explanation follows regarding an outline configuration of the damping actuator 33, which is an important element of the vehicle active damper 11 according to the present application, with reference to FIGS. 2A and 2B. FIG. 2A is a vertical cross-section of the damping actuator 33. FIG. 2B is a cross-section of the damping actuator 33 taken along line IIB-IIB of FIG. 2A, as viewed in the direction of the arrows.

The damping actuator 33, as illustrated in FIGS. 2A and 2B, includes a circular cylinder shaped housing 41 formed from a non-magnetic-body material such as, for example, aluminum. A first magnetic body core 43 and a second magnetic body core 45 are housed inside the housing 41. A through hole 41b is opened in the center of a circular shaped lid plate 41a of the housing 41. Inside the housing 41, a stud 47 that is fixed to a bottom plate of the radiator 15 and extends downward is inserted through the through hole 41b. The second magnetic body core 45 is fixed to the stud 47, so as to surround the periphery of the stud 47.

The second magnetic body core 45, serving as a movable section, is thereby configured so as to be movable according to displacement of the radiator 15 in the up-down direction, to and fro in the up-down direction with respect to the first magnetic body core 43, serving as a fixed section.

An energizing coil 49 that generates a strong magnetic field according to the magnitude of a supplied current, and a bobbin 51, are housed inside the housing 41. The energizing coil 49 is configured by winding an electrical wire (not illustrated in the drawings) onto the substantially ring shaped bobbin 51.

The first magnetic body core 43 and the second magnetic body core 45 have a function to form a circular ring shaped closed magnetic path 53 (see the arrows in FIGS. 2A and 2B) formed from magnetic flux paths derived from the magnetic field generated by energizing the energizing coil 49. The first magnetic body core 43 and the second magnetic body core 45 are, for example, formed from a ferromagnetic body or a material having ferrimagnetic properties. The first magnetic body core 43 and the second magnetic body core 45 are not magnetized when the energizing coil 49 is in a non-energized state. However, they are magnetized in a specific direction when the energizing coil energizing coil 49 is magnetized.

A circular cylinder shaped magnetorheological elastomer 55 (hereinafter sometimes referred to as MRE 55) is provided within the closed magnetic path 53 formed by the first magnetic body core 43 and the second magnetic body core 45, partway along the path of the magnetic flux derived from the magnetic field. In other words, the MRE 55 is disposed so as to be sandwiched between the first magnetic body core 43 and the second magnetic body core 45.

The MRE 55 is a elastic modulus-variable member with a modulus of elasticity that varies according to the strength of a magnetic field emitted by the energizing coil 49. More specifically, the MRE 55 includes a base elastomer 55a having viscoelastic properties, and magnetic particles 55b dispersed within the base elastomer 55a. A known polymer material having viscoelastic properties at room temperature, such as a silicon rubber, may be appropriately employed as the material for the base elastomer 55a. The base elastomer 55a is formable in a freely selected shape.

The magnetic particles 55b have the property of magnetic polarization under the action of a magnetic field. A known material, for example, a metal such as pure iron, an organic substance such as a triaminobenzine polymer, or an organic or inorganic composite such as a ferrite dispersed anisotropic plastic, may be appropriately employed as the material for the magnetic particles 55b. The shape of the magnetic particles 55b is not particularly limited, and, for example, spherical, needle shaped, or flat plate shaped particles may be appropriately applied therefor. The particle size of the magnetic particles 55b is not particularly limited, and may, for example, from about 0.01 μm to about 500 μm.

The magnetic particles 55b configuring part of the MRE 55 are, as illustrated in FIGS. 2A and 2B, in a state held in the base elastomer 55a so as to be oriented in a pattern radiating along the radial direction of the housing 41. Employing the MRE 55 in which the magnetic particles 55b are oriented in a radial pattern enables an effect to be anticipated of the modulus of elasticity of the MRE 55 varying according to the strength of the magnetic field generated by the energizing coil 49.

Outline of the Periphery of a Controller 61 that Controls the Damping Actuator 33

Figure 3:
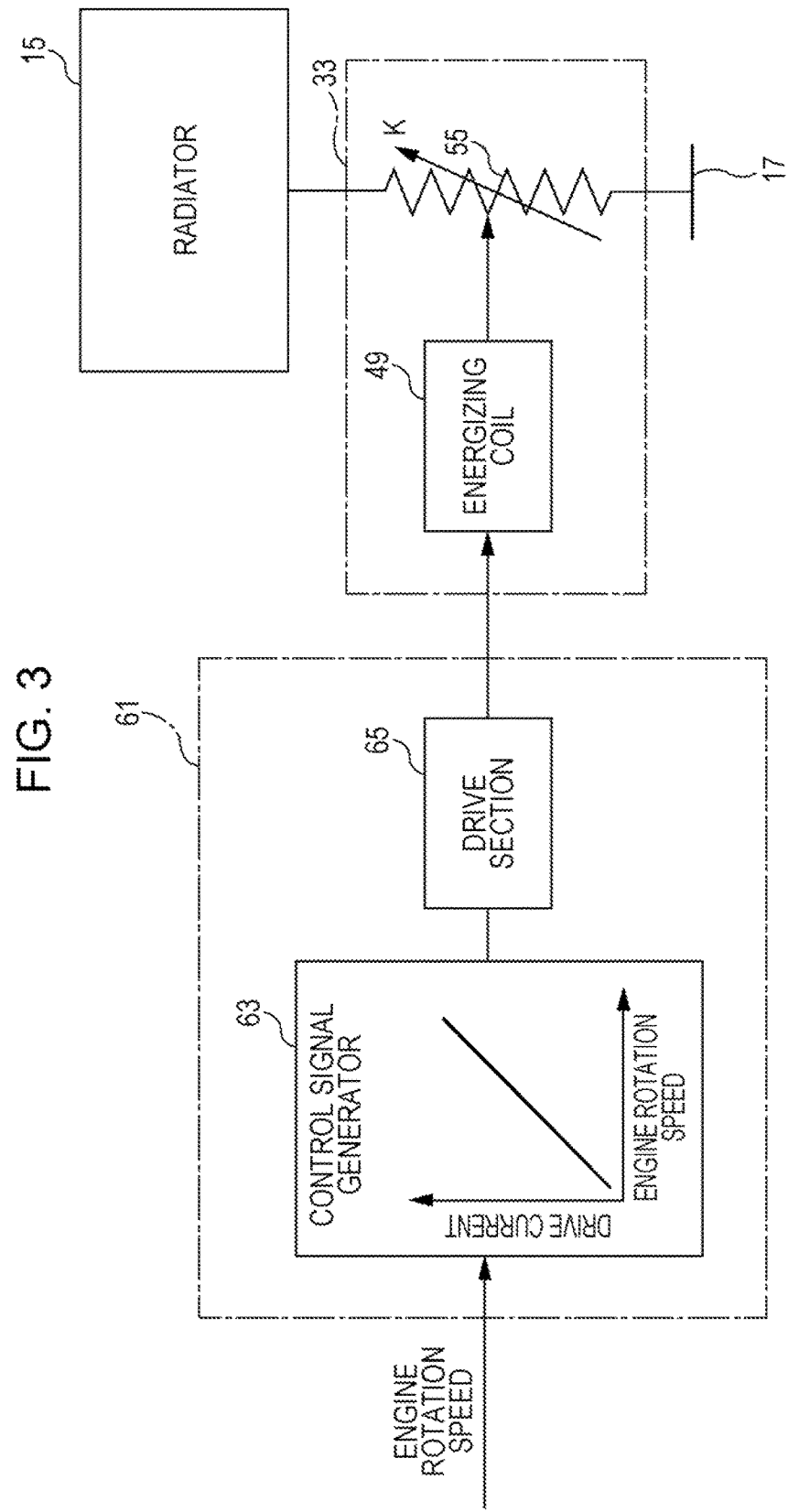
FIG. 3 is a block diagram illustrating an outline of the periphery of a controller that controls a damping actuator.

Next, explanation follows regarding the controller 61 that controls the damping actuator 33, with reference to FIG. 3. FIG. 3 is a block diagram illustrating an outline of the periphery of the controller 61 that controls the damping actuator 33.

The controller 61 is configured including a control signal generator 63, and a drive section 65. The controller 61 is configured by a microcomputer including a central processing unit (CPU), read only memory (ROM), and random access memory (RAM). The microcomputer reads and executes a program stored in the ROM and controls execution of various functions including a control signal generation function.

The control signal generator 63 references a conversion table of drive current values corresponding to the engine rotation speed, computes the drive current corresponding to the engine rotation speed, and generates a control signal including information of the computed drive current. The control signal generated by the control signal generator 63 is sent to the drive section 65. The drive section 65 is configured including a non-illustrated power source, a semiconductor switching device, and the like. The drive section 65 supplies a drive current following the control signal generated by the control signal generator 63 to the energizing coil 49 of the damping actuator 33.

When a drive current has been supplied by the drive section 65, the energizing coil 49 generates a magnetic field of a strength that accords with the rise and fall of the drive current (with rise and fall of the engine rotation speed). The elastic modulus (K) of the MRE 55 changes due to the change in the rigidity of the MRE 55 of the damping actuator 33. As a result, the natural vibration frequency fluctuates in the active dynamic damper configured with the damping actuator 33 interposed between the radiator 15 and the vehicle body 17.

Behavior of the Damping Actuator 33

Figure 4:
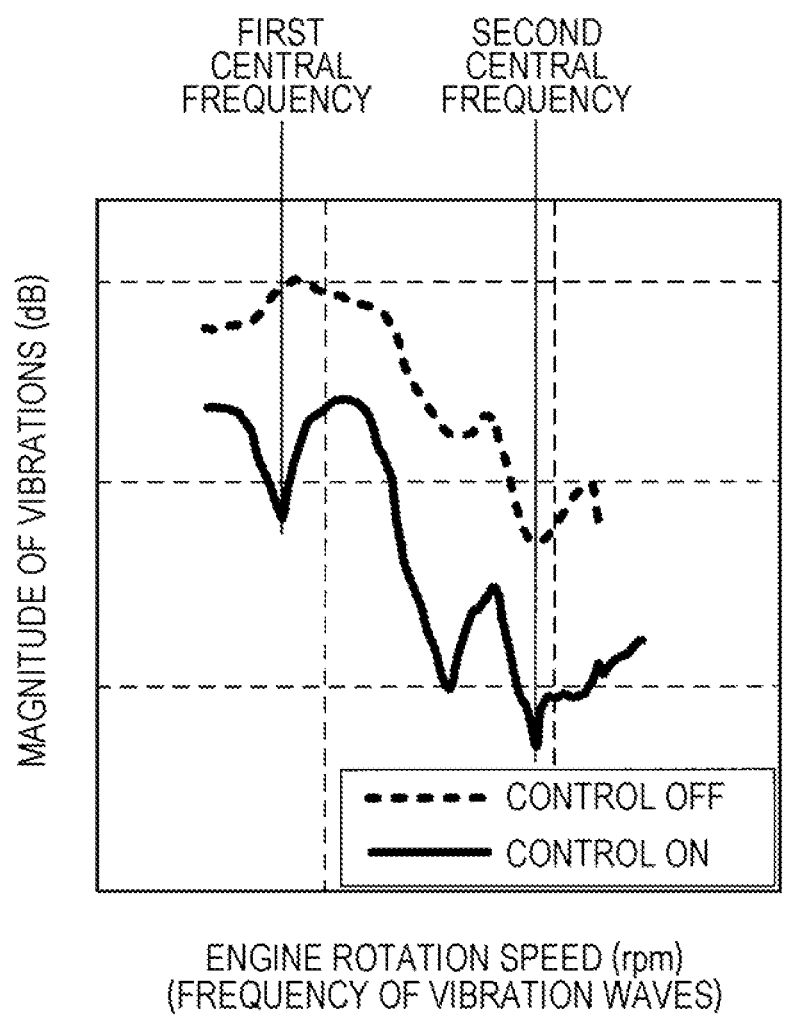
FIG. 4 is an explanatory diagram illustrating the magnitude of vibrations when a damping actuator is controlled ON, compared to the magnitude of vibrations when the damping actuator is controlled OFF, when rotation speed of an engine has changed.

Next, explanation follows regarding the behavior of the damping actuator 33, with reference to FIG. 4. FIG. 4 is an explanatory diagram illustrating the rise and fall of vibrations when control of the damping actuator 33 is ON, compared to the rise and fall of vibrations when control of the damping actuator 33 is OFF, when the rotation speed of the engine 13 has changed.

In the damping actuator 33, due to the magnetic particles 55b not being magnetically polarized in a non-energized state of the energizing coil 49 (in a weak magnetic field state), the magnetic particles 55b are held as they are in the initial state (in a dispersed state). The apparent rigidity of the MRE 55 is accordingly maintained at an initial value.

When the energizing coil 49 is then energized, the magnetic particles 55b become coupled together by magnetic polarization under the action of the magnetic field generated by this energization, and are aligned along the direction of the magnetic field. The apparent rigidity of the MRE 55 is accordingly higher than the initial value.

The apparent rigidity of the MRE 55 fluctuates according to the strength of the magnetic field generated by the energization of the energizing coil 49 (the rise and fall of the engine 13 rotation speed: the frequency of the vibration waves), so as to be higher the stronger the magnetic field.

The ease of movement of the second magnetic body core 45, serving as the movable section, relative to the first magnetic body core 43, serving as the fixed section, (to and fro movement in the up-down direction synchronized with to and fro movement of the radiator 15), namely the apparent mass of the radiator 15 (the natural vibration frequency of the active dynamic damper), changes due to such fluctuations in the apparent rigidity of the MRE 55. Thus the frequency band of damping target vibration waves capable of being damped changes according to the value of the rotation speed of the engine 13 (the frequency of the vibration waves).

More specifically, in the present embodiment, the apparent rigidity of the MRE 55 is variable according to fluctuations in the rotation speed of the engine 13 (fluctuations in the frequency of the vibration waves). Thus the natural vibration frequency of the active dynamic damper configured by interposing the damping actuator 33 between the radiator 15 and the vehicle body 17 is adjusted so as to match the resonance frequency of the vibration waves originating from the rotation speed of the engine 13. Thus the natural vibration frequency of the active dynamic damper is made to follow frequency fluctuations in the damping target vibration waves, thereby maintaining a high attenuation effect state.

As a result, as illustrated in FIG. 4, fluctuations in the rotation speed of the engine 13 (fluctuations in the frequency of vibration waves) can be followed better during control of the damping actuator 33 to ON, than during control to OFF, and an attenuation effect on vibration components can be secured.

Technical Effects of the Vehicle Active Damper 11 According to the Embodiment of the Present Application The vehicle active damper 11 according to the embodiment of the present application includes the damping actuator 33 (the first elastic member) provided so as to be interposed between the radiator 15 and the vehicle body 17 in a substantially vertical direction, and the coupling member 31 (the second elastic member) that elastically couples between the vehicle body 17 and the engine 13. The damping actuator 33 is formed from a elastic modulus-variable member with an elastic modulus that is variable according to the strength of the applied magnetic field. The coupling member 31 transmits vibrations of the engine 13 to the vehicle body 17 along a substantially vertical direction.

The vibrations of the engine 13 are respectively input to the radiator 15 through the coupling member 31, the vehicle body 17, and the damping actuator 33. In the process by which the vibrations of the engine 13 are transmitted, the apparent mass of the radiator 15 (the inertial mass) (and hence the natural vibration frequency of the active dynamic damper) can be appropriately adjusted by control to apply a desired magnetic field to the damping actuator 33 and to change the elastic modulus of the damping actuator 33.

Thus the vehicle active damper 11 according to the embodiment of the present application employs the radiator 15 itself as the inertial mass, and uses an active dynamic damper function that widens the frequency band of damping target vibration waves using the action of the damping actuator 33, so as to actively suppress vibrations occurring in the vehicle body 17. This thereby enables an attenuation effect to be secured for vibration components over a wide frequency band.

Moreover, the action direction of damper waves generated by employing the damping actuator 33, and the vibration transmission direction of the engine 13 with respect to the vehicle body 17 employing the coupling member 31, are common directions. An effect can accordingly anticipated of vibrations of the engine 13 being effectively attenuated by adjusting the phase of the damper waves generated by employing the damping actuator 33 so as to be the opposite phase to the phase of the vibration waves of the engine 13.

The coupling member 31 may employ a configuration including the engine bracket 27 (the extension portion) that is provided to the engine 13 so as to extend from the engine 13 toward the front side in the front-rear direction of the car Ca, and including the rod portion 29 that elongates in the substantially vertical direction so as to couple between the engine bracket 27 and the vehicle body 17.

Adopting such a configuration enables an anticipated effect of vibrations of the engine 13 being effectively attenuated due to the vibrations of the engine 13 being transmitted to the vehicle body 17 in a substantially vertical direction through the coupling member 31 (the second elastic member) that includes the engine bracket 27 and the rod portion 29. This thereby suppresses a situation from occurring in which vibrations occurring in the vehicle body 17 are transmitted to inside the vehicle cabin.

The rod portion 29 may also employ a configuration such that a first central frequency, positioned at substantially the center of the frequency band of the damping target vibration waves in a first damping control system employing the damping actuator 33 (the first elastic member) formed from the elastic modulus-variable member having an elastic modulus that varies according to the strength of an applied magnetic field, and a second central frequency, positioned at substantially the center of the frequency band of the damping target vibration waves in a second damping control system employing the rod portion 29 (the second elastic member), are set to different frequencies from each other.

In the first damping control system using the damping actuator 33, sufficient attenuation effect is not able to be manifested by the active dynamic damper in frequency bands outside of the frequency band of the damping target vibration waves. Moreover, there is a tendency for the rise and fall of vibrations to be amplified in the frequency bands that appear at both sides of the frequency axis on either side of the first central frequency, compared with cases not applied with the active dynamic damper of the first damping control system.

Thus the function to widen the frequency band of the damping target vibration waves using the action of the rod portion 29 (the elastic modulus-variable member), acts so as to be superimposed on the dynamic damper function that employs the radiator 15 itself as the inertial mass to widen the frequency band of the damping target vibration waves using the action of the first damping control system employing the damping actuator 33. When this is performed, the first central frequency and the second central frequency are set so as to be different frequencies from each other.

The configuration of the rod portion 29 may be achieved by applying appropriate modifications to the configuration of the damping actuator 33. In such cases, a control section that controls the rod portion 29 may be achieved by applying appropriate modifications to the configuration of the controller 61.

Adopting such a configuration enables an attenuation effect to be secured for vibration components in a wider frequency band, due to setting the first central frequency and the second central frequency to different frequencies from each other.

Moreover, a configuration may be adopted in which the first central frequency, positioned at substantially the center of the frequency band of the damping target vibration waves in the first damping control system employing the damping actuator 33, is set to a lower frequency than the second central frequency, positioned at substantially the center of the frequency band of the damping target vibration waves in the second damping control system employing the rod portion 29 (the elastic modulus-variable member).

Adopting such a configuration enables sufficient attenuation of vibration components in a low frequency band due to the active dynamic damper function manifested by the first damping control system employing the radiator 15 itself as the inertial mass, and enables sufficient attenuation of vibration components in a frequency band higher than the low frequency band due to the active damping function manifested by the second damping control system.

Other Embodiments

The embodiments explained above merely illustrate specific examples of the present application. Thus they should not be interpreted as limiting the technical scope of the present application. Appropriate modified embodiments may be implemented without departing from the spirit of the present application, or from the main characteristics thereof.

For example, although explanation has been given of an example of the embodiment of the present application employing the following configuration for the damping actuator 33 (the first elastic member), the present application is not limited to this example. The damping actuator 33 configuration includes the first magnetic body core 43 and the second magnetic body core 45 that form the circular ring shaped closed magnetic path, the energizing coil 49 that energizes the first and second magnetic body cores 43, 45, and the magnetorheological elastomer 55 having an elastic modulus that varies according to the strength of the magnetic field occurring due to energization by the energizing coil 49, with these components all housed inside the circular cylinder shaped housing 41, and with the magnetorheological elastomer 55 configured so as to be disposed sandwiched between the first magnetic body core 43 (the fixed section) and the second magnetic body core 45 (the moveable section).

A bush and mounting, or the like, formed from the magnetorheological elastomer 55 may be employed as the configuration of the damping actuator 33 (the first elastic member). In such cases, preferably a housing formed from a non-magnetic-body material is employed to cover the outer periphery of the bush and mounting formed from the magnetorheological elastomer 55. Adopting such a configuration enables a situation to be suppressed from occurring in which heat, radiating from the radiator 15, is transmitted to the bush and mounting.

Moreover, the "substantially vertical direction" of the present application is not limited to merely the vertical direction. Consider, for example, a direction that is inclined with respect toward the vertical direction. The direction that is inclined with respect toward the vertical direction may still fall within the meaning of the "substantially vertical direction", as long as vertical direction components of vibration or force are transmitted to and fro between the radiator 15 and the vehicle body 17, and between the vehicle body 17 and the engine 13.

The "vehicle body" of the present application is not limited to a main frame and sub frame forming a frame of the vehicle body 17, and has a meaning that encompasses attachment members such as brackets that are attached thereto.

Although explanation has been given, when explaining an embodiment of the present application, of an example in which, as the configuration of the rod portion 29, appropriate modifications are made to the configuration of the damping actuator 33, the present application is not limited thereto. A configuration may be adopted in which, as the configuration of the rod portion 29, an existing torque rod is disposed vertically so as to elastically couple between the vehicle body 17 and the engine 13.

Finally, although explanation has been given, when explaining an embodiment of the present application, of an example in which the magnetic particles 55*b* configuring part the MRE 55 are oriented in a radiating pattern along the radial direction of the housing 41 in a state held in the base elastomer 55*a*, the present application is not limited to such an example. The magnetic particles 55*b* configuring part of the MRE55 may be oriented in any pattern, as long as they are able to secure an effect of varying elastic modulus according to the strength of the magnetic field generated by the energizing coil 49.

For example, in order to simplify manufacture of the MRE 55, a configuration may be adopted in which the magnetic particles 55*b* are dispersed and held randomly (irregularly) within the base elastomer 55*a*, instead of being given a regular orientation. In such cases, setting the elastic modulus according to the strength of the magnetic field generated by the energizing coil 49 may be performed by appropriately adjusting the proportional content of the magnetic particles 55*b* relative to the base elastomer 55*a*.

What is claimed is:

1. A vehicle active damper that actively suppresses vibrations transmitting from an engine of a vehicle to a vehicle body that supports the engine of the vehicle, the vehicle active damper comprising:
 a first elastic member that is directly attached to a radiator of the vehicle and the vehicle body so as to be interposed therebetween along a substantially vertical direction; and
 a second elastic member that is provided between the vehicle body and the engine and elastically couples the vehicle body and the engine, wherein
  the first elastic member is an elastic modulus-variable member having an elastic modulus that can vary according to a strength of a magnetic field applied to the first elastic member, and
  the second elastic member transmits the vibrations of the engine to the vehicle body along the substantially vertical direction.

2. The vehicle active damper according to claim 1, wherein the second elastic member comprises:
 an extension portion that is provided to the engine and that extends from the engine towards a front side in a front-rear direction of the vehicle; and
 a rod portion that extends in the substantially vertical direction so as to couple the extension portion and the vehicle body in the substantially vertical direction.

3. The vehicle active damper of claim 2, wherein:
 the rod portion is an elastic modulus-variable member having an elastic modulus that can vary according to the strength of a magnetic field applied to the rod portion; and
 the first and second elastic members and their damping targets that include the radiator and the vehicle body constitute first and second damping control systems, respectively, a first central frequency positioned at substantially a center of a frequency band of damping target vibration waves in the first damping control system is different from a second central frequency positioned at substantially a center of a frequency band of damping target vibration waves in the second damping control system.

4. The vehicle active damper according to claim 3, wherein the first central frequency is lower than the second central frequency.

* * * * *